(12) United States Patent
Tsuchida et al.

(10) Patent No.: US 11,632,004 B2
(45) Date of Patent: *Apr. 18, 2023

(54) ELECTRIC MOTOR WITH STATOR (71) Applicant: Mitsubishi Electric Corporation, Tokyo (JP)

(72) Inventors: Kazuchika Tsuchida, Tokyo (JP); Yuji Takayama, Tokyo (JP); Keisuke Uemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

This patent is subject to a terminal disclaimer.

(21) Appl. No.: 17/137,617

(22) Filed: Dec. 30, 2020

(65) Prior Publication Data
US 2021/0119497 A1 Apr. 22, 2021

Related U.S. Application Data

(63) Continuation of application No. 16/469,253, filed as application No. PCT/JP2017/006979 on Feb. 24, 2017, now Pat. No. 10,998,777.

(51) Int. Cl.
*H02K 1/14* (2006.01)
*H02K 11/215* (2016.01)
*H02K 3/32* (2006.01)

(52) U.S. Cl.
CPC ............. *H02K 1/146* (2013.01); *H02K 3/325* (2013.01); *H02K 11/215* (2016.01); *H02K 2213/03* (2013.01)

(58) Field of Classification Search
CPC ........ H02K 1/146; H02K 1/148; H02K 3/325; H02K 11/215; H02K 2213/03
See application file for complete search history.

(56) References Cited

U.S. PATENT DOCUMENTS

| 5,294,856 A | 3/1994 | Horst |
| 5,670,836 A | 9/1997 | Horst |
| 5,703,426 A | 12/1997 | Ueno |
| 5,804,896 A | 9/1998 | Takehara et al. |
| 2006/0273667 A1 | 12/2006 | Horng |

(Continued)

FOREIGN PATENT DOCUMENTS

| CN | 201536306 U | 7/2010 |
| JP | H08-182281 A | 7/1996 |

(Continued)

OTHER PUBLICATIONS

Office Action dated Sep. 3, 2021 issued in corresponding CN patent application No. 201780083757.3 (and English machine translation).

(Continued)

*Primary Examiner* — Emily P Pham
(74) *Attorney, Agent, or Firm* — Posz Law Group, PLC (57) ABSTRACT

An electric motor includes a stator including four split cores, and a rotor having four magnetic poles. Each of the split cores includes a yoke and a tooth. An angle θ1 [degree] formed by a side surface of the tooth and a side surface of the yoke on an inner side in a radial direction of the stator satisfies 90 degrees ≤θ1<180 degrees.

8 Claims, 8 Drawing Sheets

(56) References Cited

U.S. PATENT DOCUMENTS

| | | | |
|---|---|---|---|
| 2008/0134491 A1* | 6/2008 | Nishimura | H02K 15/02 29/598 |
| 2010/0123426 A1 | 5/2010 | Nashiki | |
| 2012/0025665 A1 | 2/2012 | Takahashi | |
| 2015/0042194 A1 | 2/2015 | Li | |
| 2015/0061448 A1 | 3/2015 | Kimura | |
| 2015/0372543 A1 | 12/2015 | Lobo | |
| 2016/0344244 A1* | 11/2016 | Li | H02K 29/03 |
| 2017/0077769 A1 | 3/2017 | Li | |
| 2018/0226864 A1* | 8/2018 | Kim | H02K 21/14 |
| 2018/0248419 A1* | 8/2018 | Nigo | H02K 1/02 |

FOREIGN PATENT DOCUMENTS

| | | |
|---|---|---|
| JP | 2005-020940 A | 1/2005 |
| JP | 2005-57849 A | 3/2005 |
| JP | 2005-080418 A | 3/2005 |
| JP | 2005-117844 A | 4/2005 |
| JP | 2008-104288 A | 5/2008 |
| JP | 2008-167598 A | 7/2008 |
| JP | 2009-050116 A | 3/2009 |
| JP | 2010-011637 A | 1/2010 |
| JP | 2012-067659 A | 4/2012 |
| JP | 2012-244739 A | 12/2012 |
| JP | 2013-243831 A | 12/2013 |
| JP | 2014-155347 A | 8/2014 |

OTHER PUBLICATIONS

International Search Report of the International Searching Authority dated May 16, 2017 for the corresponding international application No. PCT/JP2017/006979 (and English translation).

Office Action dated Jun. 2, 2020 in corresponding JP application No. 2019-104994 ( and English translation attached).

Office Action dated Nov. 23, 2020 issued in corresponding CN patent application No. 201780083757.3.

Office Action dated May 11, 2021 issued in corresponding CN patent application No. 201780083757.3 (and English machine translation).

* cited by examiner

ELECTRIC MOTOR WITH STATOR

CROSS REFERENCE TO RELATED APPLICATION

This application is a continuation application of U.S. patent application Ser. No. 16/469,253 filed on Jun. 13, 2019, which is a U.S. national stage application of International Patent Application No. PCT/JP2017/006979 filed on Feb. 24, 2017, the disclosure of which is incorporated herein by reference.

TECHNICAL FIELD

The present invention relates to an electric motor.

BACKGROUND

A stator core formed of a plurality of split cores is typically used in order to ease winding of a wire around a stator of an electric motor. Easy winding of the wire around the stator can enhance the density of a stator coil and increase motor efficiency. In an electric motor disclosed in Patent Reference 1, for example, a stator core is divided into twelve core elements, and thus the electric motor includes twelve teeth.

PATENT REFERENCE

Patent Reference 1: Japanese Patent Application Publication No. 2005-117844

In general, however, as the number of magnetic poles and the number of teeth of the stator increase, the electrical frequency of a current input to the electric motor increases. Accordingly, the waveform of the current input to the electric motor becomes roughened and consequently controllability of the electric motor (e.g., rotor rotation control) deteriorates. Thus, to enhance controllability of the electric motor in high-speed rotation at 10000 rpm or more, for example, the number of magnetic poles and the number of teeth are preferably as small as possible. For this reason, there has been a demand for an electric motor that includes a small number of magnetic poles and a small number of teeth and includes a stator including split cores around which a wire is easily wound.

SUMMARY

It is therefore an object of the present invention to provide an electric motor including a stator around which a wire is easily wound, and having high controllability.

An electric motor according to present invention includes: a stator including four split cores; and a rotor disposed inside the stator and having four magnetic poles. Each of the split cores includes a yoke and a tooth. The yoke includes a joint part having a length from the tooth outward in a radial direction of the stator and a back yoke having a length from the joint part inward in the radial direction. An angle θ1 [degree] formed by a side surface of the tooth and a side surface of the yoke on an inner side in the radial direction of the stator satisfies 90 degrees ≤θ1<180 degrees.

The present invention can provide an electric motor in which a wire is easily wound around a stator and having high controllability.

DETAILED DESCRIPTION

Embodiment

Figure 1:
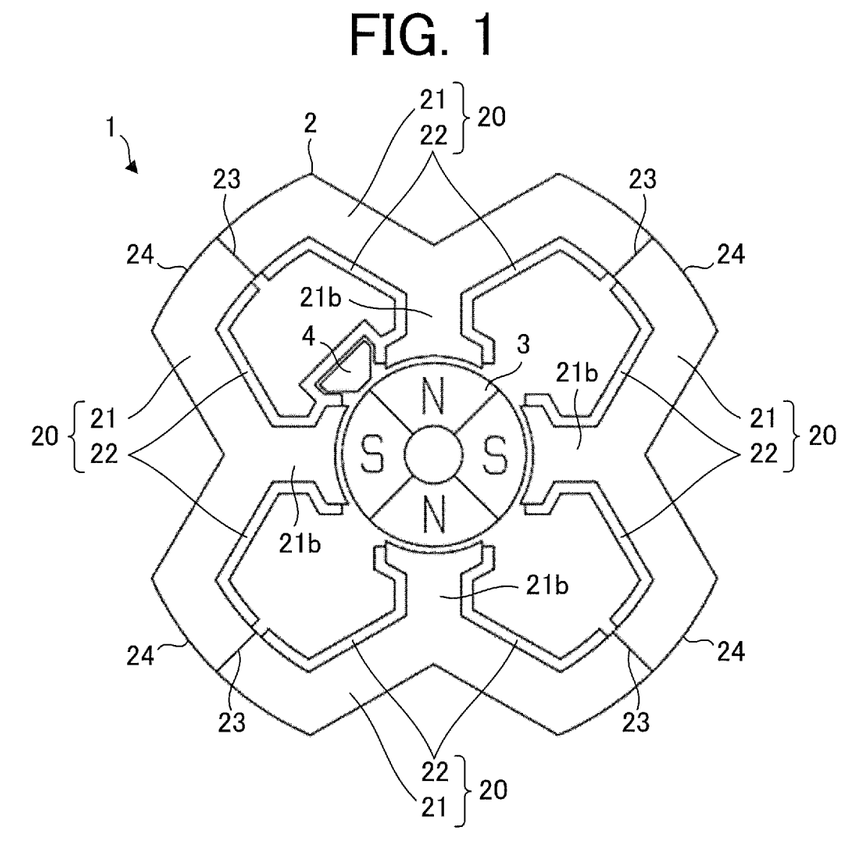
FIG. 1 is a plan view schematically illustrating a structure of an electric motor according to an embodiment of the present invention.

FIG. 1 is a plan view schematically illustrating a structure of an electric motor 1 according to an embodiment of the present invention.

Figure 2:
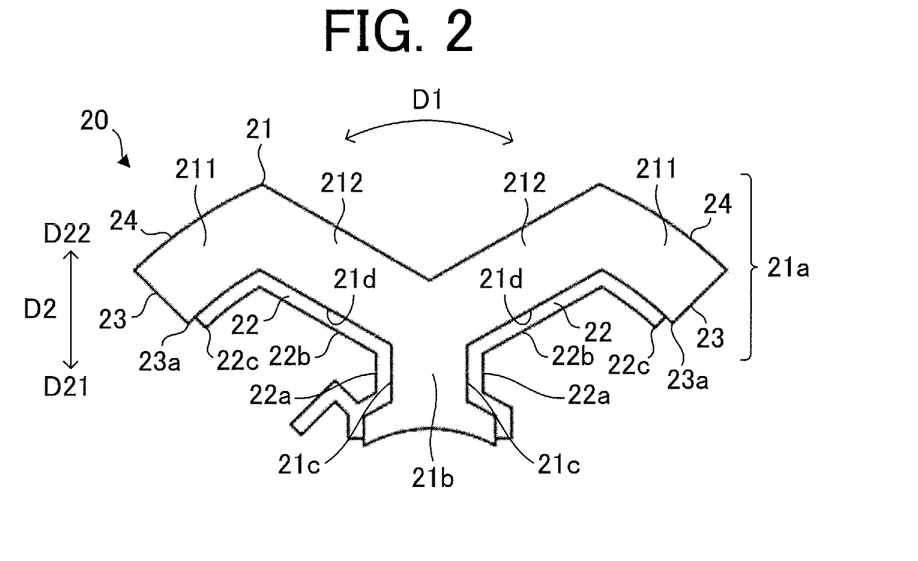
FIG. 2 is a plan view schematically illustrating a structure of a split core.
Figure 3:
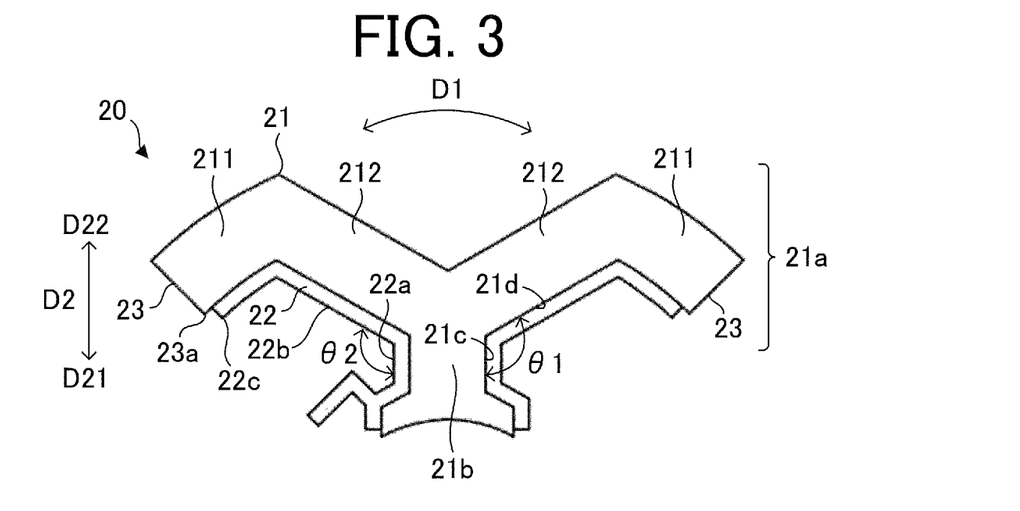
FIG. 3 is a plan view schematically illustrating the structure of the split core.
Figure 4:
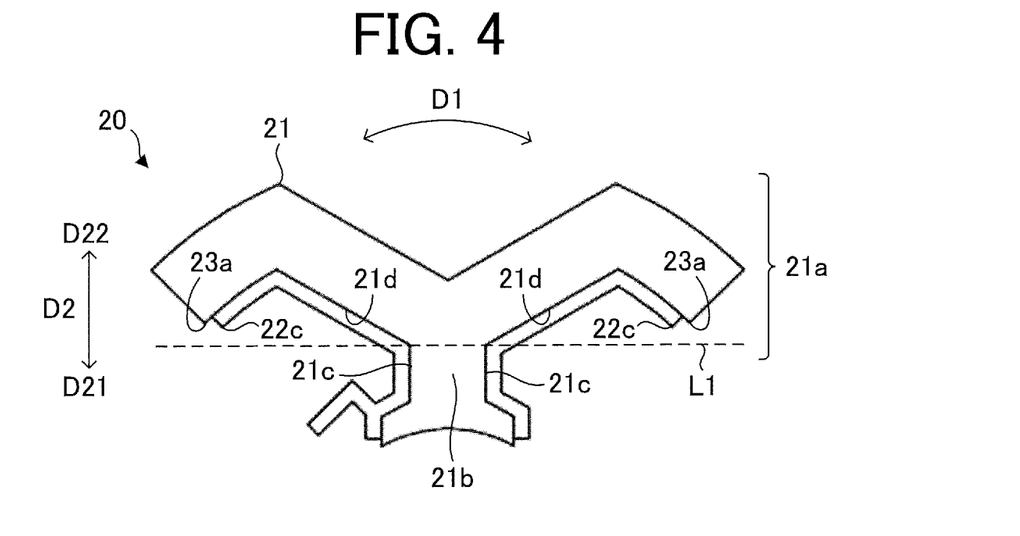
FIG. 4 is a plan view schematically illustrating the structure of the split core.

FIGS. 2 through 4 are plan views schematically illustrating a structure of a split core 20.

The electric motor 1 includes a stator 2, a rotor 3, and a position sensor 4. The electric motor 1 is, for example, a permanent magnet synchronous motor.

The electric motor 1 is driven by, for example, a single-phase inverter. In the case where the electric motor 1 is driven by the single-phase inverter, the number of times of switching can be reduced as compared to a case where a three-phase inverter is used, for example, and a switching loss during high-speed rotation can be reduced. During high-speed rotation, an electrical frequency increases and the number of times of switching increases. Thus, the advantage of using a single-phase inverter can be obtained especially during high-speed rotation.

In the case where the number of times of switching is small in the inverter, the waveform of a current input to the electric motor 1 is strained, and iron loss in the stator 2 increases due to a harmonic component of this current. Thus, as a material for a stator core 21 of the stator 2, a material such as amorphous metal is preferably used instead of an electromagnetic steel sheet. This can reduce occurrence of an iron loss in the stator 2 and also suppress degradation of motor efficiency.

The stator 2 includes the stator core 21, an insulator 22, and a plurality of split faces 23. The rotor 3 is disposed inside the stator 2 with an air gap interposed therebetween. The insulator 22 insulates the stator core 21. A wire is wound around the stator core 21 with the insulator 22 interposed therebetween.

The stator core 21 includes a plurality of yokes 21a and a plurality of teeth 21b. The stator core 21 is formed by, for example, laminating a plurality of amorphous metal sheets or a plurality of electromagnetic steel sheets.

The insulator 22 is disposed in a slot formed between adjacent two of the teeth 21b. Specifically, the insulator 22 is fixed to a side surface of the stator core 21. The insulator 22 is made of, for example, insulating resin.

An outer peripheral surface 24 of the stator core 21 is formed in the shape of a circular arc. Specifically, the outer peripheral surface 24 is an outer peripheral surface of the yoke 21a formed at an outermost portion of the yoke 21a in the radial direction.

The rotor 3 includes a plurality of permanent magnets and a plurality of magnetic poles. In this embodiment, the rotor 3 has four magnetic poles.

The position sensor 4 includes a Hall element for detecting a magnetic field from the rotor 3, for example. The position sensor 4 is fixed by the insulator 22 beside the tooth 21b in a circumferential direction. Specifically, the position sensor 4 is fixed by the insulator 22 between adjacent two teeth 21b. Accordingly, the size of the electric motor 1 can be reduced.

The electric motor 1 can be easily controlled by detecting the magnetic field from the rotor 3 by using the position sensor 4 and by detecting a rotation position (phase) of the rotor. In addition, since the position sensor 4 is fixed between two teeth 21b, it is possible to prevent the electric motor 1 from increasing in size and to make the electric motor 1 small in size.

A structure of the split core 20 will now be described.

An arrow D1 in FIGS. 2 through 4 represents a circumferential direction of the stator 2, the stator core 21, and the rotor 3 (hereinafter also referred to as simply a "circumferential direction"). An arrow D2 in FIGS. 2 through 4 represents a radial direction of the stator 2, the stator core 21, and the rotor 3 (hereinafter also referred to as simply a "radial direction"). In FIGS. 2 through 4, an arrow D21 represents an inner side in the radial direction, and an arrow D22 represents an outer side in the radial direction.

The stator 2 includes the plurality of split cores 20. In this embodiment, the stator 2 is formed of four split cores 20.

The stator 2 is divided into parts (i.e., four split cores 20) in the same number as the teeth 21b. Accordingly, the stator 2 includes four yokes 21a and four teeth 21b.

Each of the split cores 20 includes the stator core 21 and the insulator 22. Each stator core 21 includes one yoke 21a, one tooth 21b, and two split faces 23. Each of the split faces 23 is formed at an end portion of the yoke 21a of the stator core 21 in the circumferential direction. A split end portion 23a is an end portion of each of the split faces 23 on the inner side in the radial direction.

Each yoke 21a includes a back yoke 211 and a joint part 212. The joint part 212 has a length from the tooth 21b outward in the radial direction. The back yoke 211 has a length extending from the joint part 212 inward in the radial direction. The tooth 21b extends inward in the radial direction.

An angle θ1 [degree] formed by a side surface 21c of the tooth 21b and a side surface 21d of the yoke 21a on the inner side in the radial direction satisfies 90 degrees ≤θ1<180 degrees. In the example illustrated in FIG. 2, the side surface 21c of the tooth 21b is a surface extending in the radial direction, that is, a surface at each side of the tooth 21b in a direction orthogonal to the radial direction. The side surface 21d of the yoke 21a is adjacent to the side surface 21c of the tooth 21b.

In addition, as illustrated in FIG. 3, an angle θ1 [degree] preferably satisfies 90 degrees <θ1<180 degrees. This can ease winding of the wire around the tooth 21b.

Similarly, as illustrated in FIG. 3, an angle θ2 [degree] formed by a side surface 22a of the insulator 22 fixed to the tooth 21b and a side surface 22b of the insulator 22 fixed to the yoke 21a satisfies 90 degrees ≤θ2<180 degrees. The side surface 22b is adjacent to the side surface 22a.

The angle θ2 [degree] preferably satisfies 90 degrees <θ1<180 degrees. This can ease winding of the wire around the tooth 21b.

As illustrated in FIG. 4, each split end portion 23a is located outside a line L1 in the radial direction. The line L1 is a boundary between the yoke 21a and the tooth 21b. That is, the line L1 is a boundary between the side surface 21d of the yoke 21a and the side surface 21c of the tooth 21b.

Similarly, an end portion 22c that is an end portion of the insulator 22 in the circumferential direction is located outside the line L1 in the radial direction. Accordingly, an advantage of easing wiring of the wire can be obtained, and the density of the stator coil can be increased.

Figure 5:
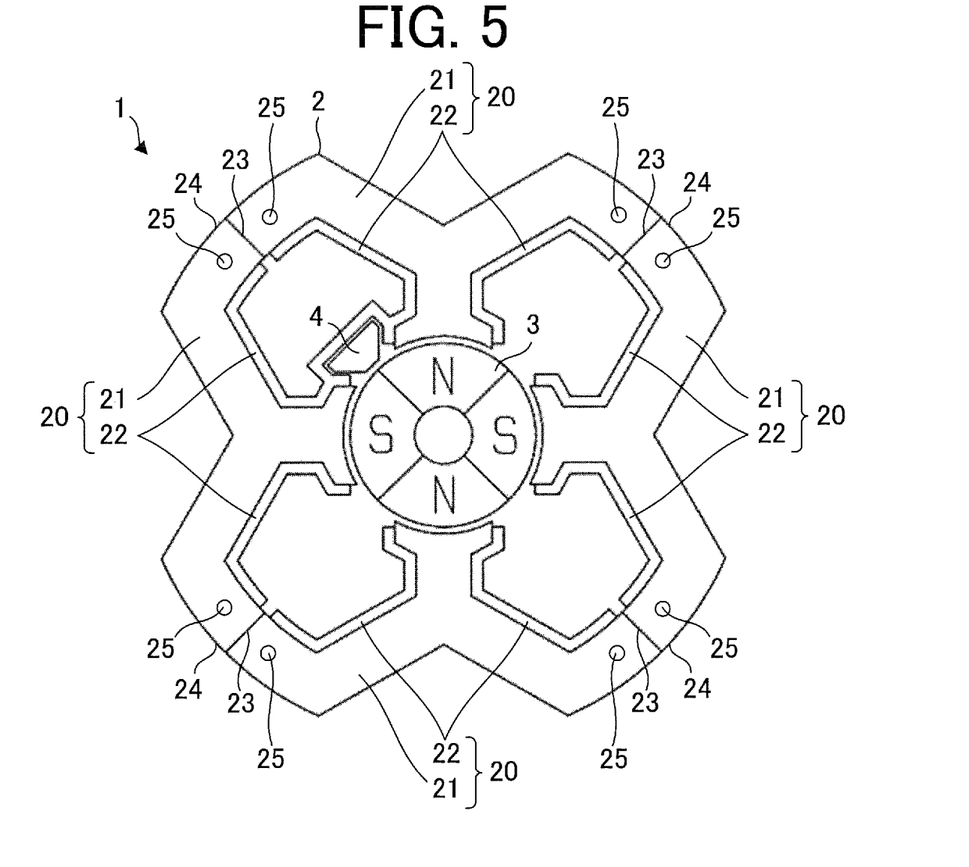
FIG. 5 is a plan view schematically illustrating a structure of the electric motor including a stator fixed by caulked parts.

FIG. 5 is a plan view schematically illustrating a structure of the electric motor 1 including the stator 2 fixed by caulked parts 25.

Figure 6:
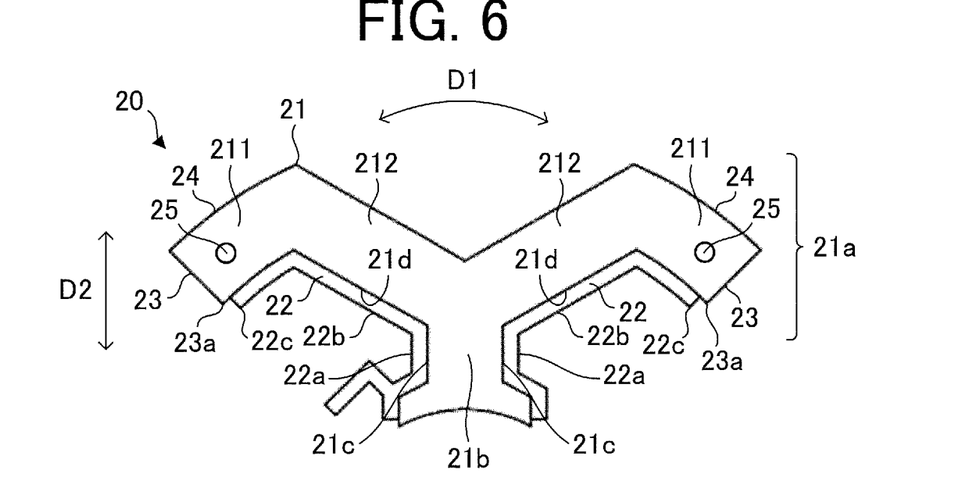
FIG. 6 is a plan view schematically illustrating a structure of a split core including the stator core fixed by caulked parts.

FIG. 6 is a plan view schematically illustrating a structure of the split core 20 including the stator core 21 fixed by caulked parts 25.

As illustrated in FIGS. 5 and 6, a plurality of amorphous metal sheets or a plurality of electromagnetic steel sheets forming the stator core 21 may be fixed by caulked parts 25. The structure of the electric motor 1 illustrated in FIG. 5 and the split core 20 illustrated in FIG. 6 are the same as those of the electric motor 1 and the split core 20, respectively, illustrated in FIGS. 1 through 4 except for the caulked parts 25.

The use of the caulked parts 25 stabilizes the shape of the stator core 21 to thereby stabilize the shape of the split faces 23. Accordingly, in fitting a frame 5 (FIG. 18) into the electric motor 1 by shrink fitting, for example, it is possible to prevent the split cores 20 from becoming apart from one another at the split faces 23.

Advantages of the electric motor 1 according to this embodiment will now be described.

Figure 7:
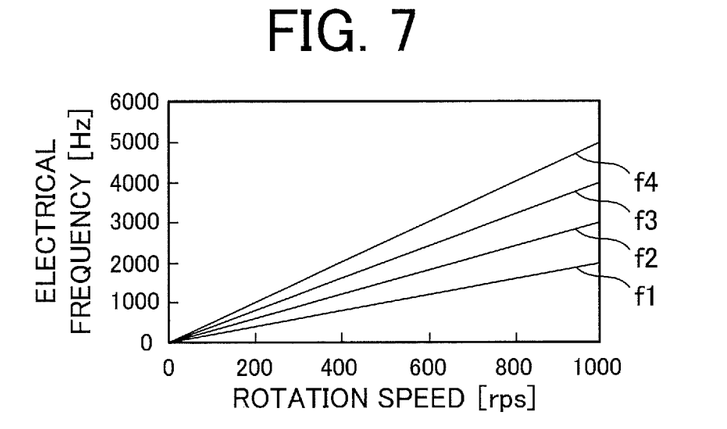
FIG. 7 is a diagram showing a relationship between a rotation speed [rps] of the electric motor and an electrical frequency [Hz] of a current input to the electric motor, for each number of magnetic poles of a rotor.

FIG. 7 is a diagram showing a relationship between the rotation speed [rps] of the electric motor and an electrical frequency [Hz] of a current input to the electric motor, for each number of magnetic poles of a rotor. Specifically, FIG. 7 is a diagram showing a relationship between the rotation speed of the electric motor and the electrical frequency in the case where the number of magnetic poles of the electric motor is changed. In FIG. 7, f1 indicates a relationship between the rotation speed and the electrical frequency in the electric motor 1 according to this embodiment, f2 indicates a relationship between the rotation speed and the electrical frequency in an electric motor including six magnetic poles and six teeth, f3 indicates a relationship between the rotation speed and the electrical frequency in an electric motor including eight magnetic poles and eight teeth, and f4 indicates a relationship between the rotation speed and the electrical frequency in an electric motor including ten magnetic poles and ten teeth.

Figure 8:
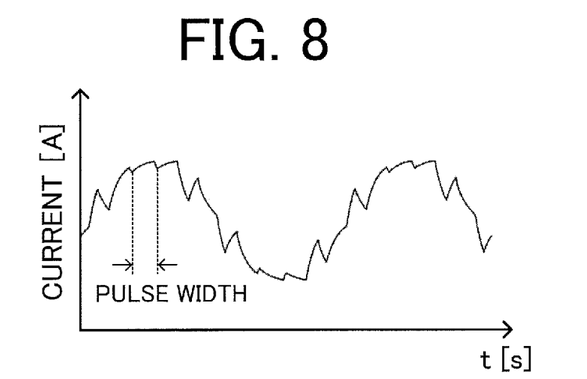
FIG. 8 is a diagram showing a waveform of a current input to the electric motor according to the embodiment.

FIG. 8 is a diagram showing a waveform of a current input to the electric motor 1 according to this embodiment.

Figure 9:
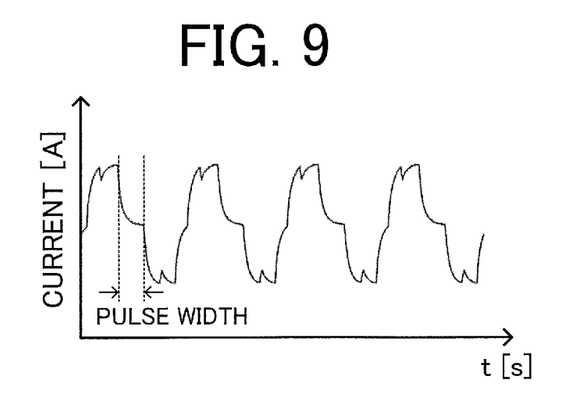
FIG. 9 is a diagram showing a waveform of a current input to an electric motor having eight magnetic poles as a comparative example.

FIG. 9 is a diagram showing a waveform of a current input to an electric motor including eight magnetic poles as a comparative example. The waveforms shown in FIGS. 8 and 9 are waveforms of a current input to the electric motor 1 while the rotor 3 makes one turn, and have the same carrier frequency.

As shown in FIG. 7, as the number of magnetic poles increases, the electrical frequency of the current input to the electric motor increases. For example, when the number of magnetic poles increases from four to eight, the electrical frequency doubles. Thus, as shown in FIG. 9, the waveform of a current input to the electric motor including eight magnetic poles is rougher than that in the electric motor 1 including four magnetic poles (FIG. 8) when the carrier frequency is constant. As the waveform of a current becomes rougher, controllability of the electric motor (e.g., rotation control of a rotor) deteriorates. Thus, to drive the electric motor in high-speed rotation of 10000 rpm or more, the number of magnetic poles is preferably as small as possible and the electrical frequency is preferably as low as possible. Then, controllability of the electric motor is improved.

As described above, to improve controllability of the electric motor 1, in the electric motor 1 according to this embodiment, the rotor 3 includes four magnetic poles and the stator 2 includes four teeth 21b. Accordingly, as compared to an electric motor including six or more magnetic poles, controllability can be enhanced even in the case of driving at 10000 rpm or more.

In the case where the electric motor 1 is driven by a single-phase inverter, the number of times of switching can be reduced and a switching loss in high-speed rotation can be reduced, as compared to the case of driving by a three-phase inverter, for example.

Each yoke 21a includes a back yoke 211 and a joint part 212. The joint part 212 has a length from the tooth 21b outward in the radial direction. The back yoke 211 has a length from the joint part 212 inward in the radial direction. Accordingly, a region where a stator coil is formed by winding of the wire can be enlarged.

Figure 10:
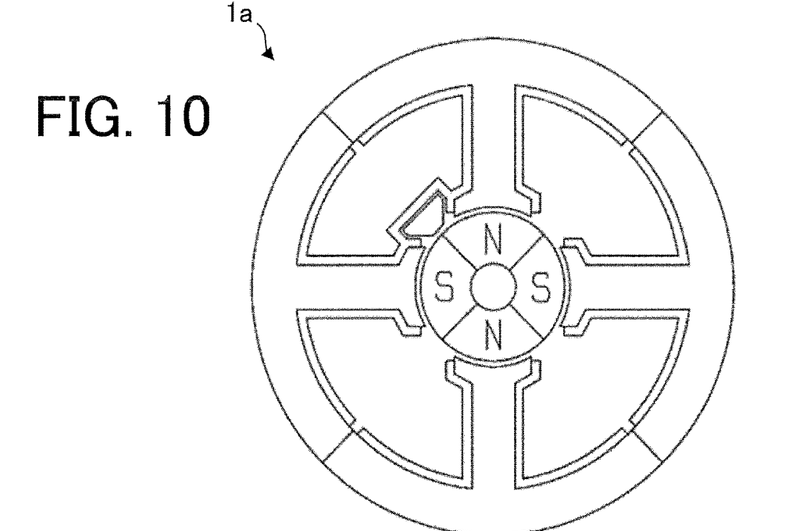
FIG. 10 is a plan view schematically illustrating a structure of an electric motor as a first comparative example.

FIG. 10 is a plan view schematically illustrating a structure of an electric motor 1a as a first comparative example.

Figure 11:
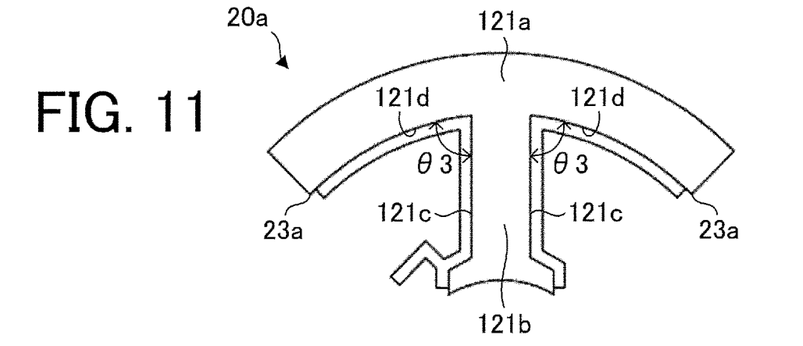
FIG. 11 is a plan view schematically illustrating a structure of a split core of the electric motor as the first comparative example.

FIG. 11 is a plan view schematically illustrating a structure of a split core 20a of the electric motor 1a as the first comparative example.

Figure 12:
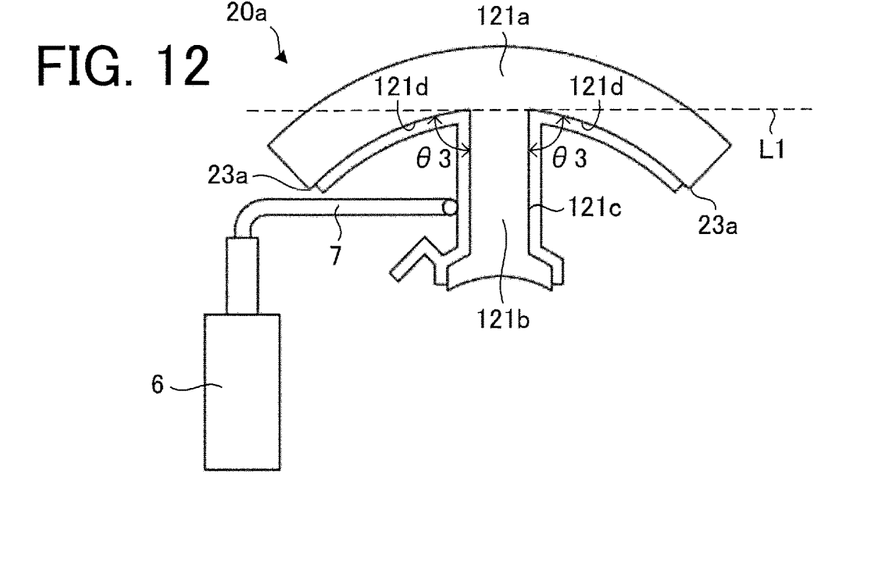
FIG. 12 is a view illustrating an example of a process of winding a wire around the split core of the electric motor as the first comparative example.

FIG. 12 is a view illustrating an example of a process of winding a wire 7 around the split core 20a.

The electric motor 1a according to the first comparative example includes four magnetic poles and four teeth 121b, in a manner similar to the electric motor 1 according to this embodiment. The electric motor 1a includes four split cores 20a. The teeth 121b correspond to the teeth 21b of the electric motor 1 and are the same as the teeth 21b in structure. In the electric motor 1a, a yoke 121a differs in structure from the yoke 21a of the electric motor 1 according to the embodiment. Specifically, a maximum angle θ3 formed by a side surface 121c of the tooth 121b and a side surface 121d of the yoke 121a is smaller than 90 degrees.

A wire is typically wound around the tooth using a nozzle. If the stator is not divided into a plurality of cores, it is difficult to wind a wire so as to increase the density of a stator coil. On the other hand, in this embodiment, since the stator 2 is divided into a plurality of cores, the wire can be easily wound around each of the teeth 21b using the nozzle, and the density of the stator coil can be increased. To prevent a positional shift of the position sensor 4, the wire is not preferably wound near the position sensor 4.

In the electric motor 1a illustrated in FIGS. 10 and 11, however, since the maximum angle θ3 is smaller than 90 degrees, the split end portion 23a is located inside the line L1 in the radial direction as illustrated in FIG. 12. Accordingly, the yoke 121a hinders operation of a nozzle 6, and it is difficult to wind a wire 7 especially around a portion of the tooth 121b on the outer side in the radial direction. On the other hand, in the electric motor 1 according to this embodiment, the angle θ1 [degree] satisfies 90 degrees ≤θ1<180 degrees. Accordingly, in the electric motor 1 according to this embodiment, the split core 20 can be formed such that the split end portion 23a is located outside the line L1 in the radial direction, and thus, the wire can be easily wound, advantageously.

Figure 13:
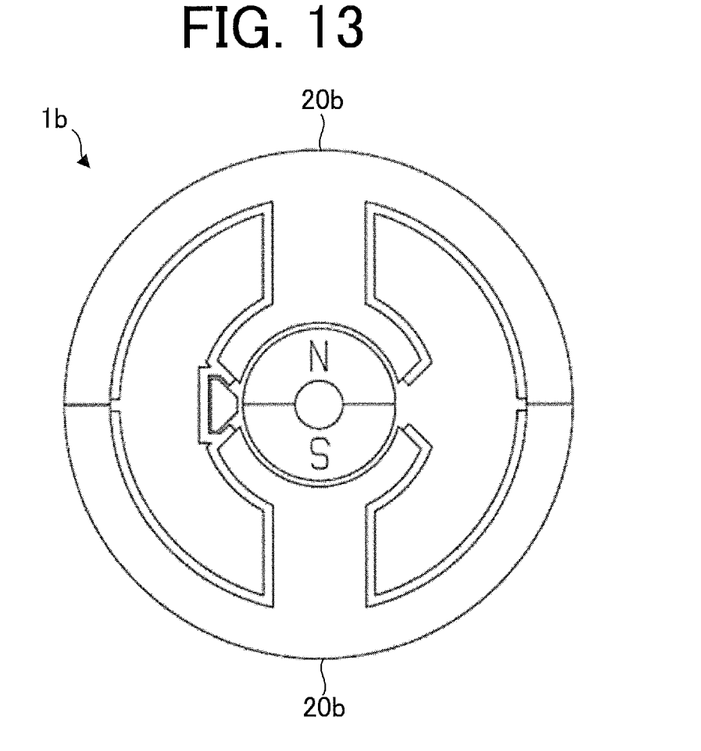
FIG. 13 is a plan view schematically illustrating a structure of an electric motor as a second comparative example.

FIG. 13 is a plan view schematically illustrating a structure of an electric motor 1b as a second comparative example.

Figure 14:
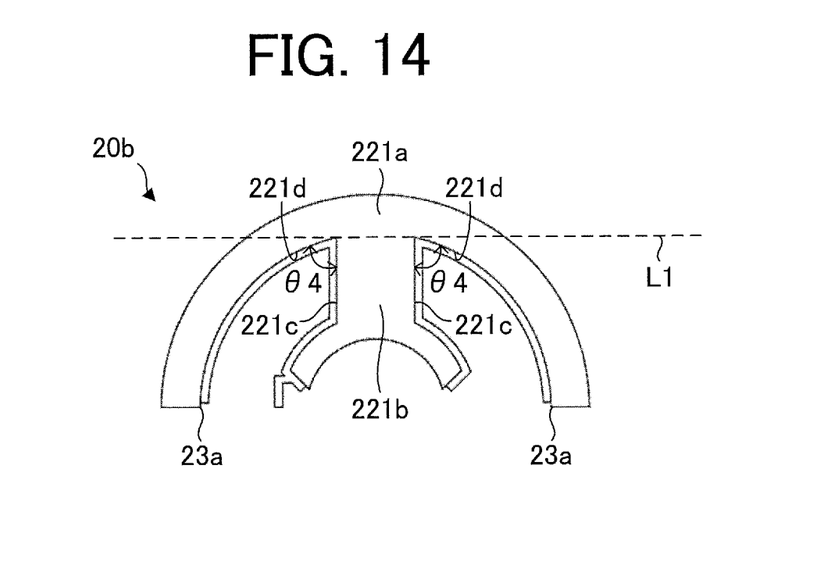
FIG. 14 is a plan view schematically illustrating a structure of a split core of the electric motor as the second comparative example.

FIG. 14 is a plan view schematically illustrating a structure of a split core 20b of the electric motor 1b as the second comparative example.

The electric motor 1b according to the second comparative example includes two magnetic poles and two teeth 221b. The electric motor 1b includes two split cores 20b. In the electric motor 1b, a yoke 221a differs in structure from the yoke 21a of the electric motor 1 according to the embodiment. Specifically, a maximum angle θ4 formed by a side surface 221c of the tooth 221b and a side surface 221d of the yoke 221a on the inner side in the radial direction is smaller than 90 degrees.

Thus, in a manner similar to the electric motor 1a according to the first comparative example, since the maximum angle θ4 is also smaller than 90 degrees in the electric motor 1b, the yoke 221a hinders operation of the nozzle 6 in winding a wire, and it is difficult to wind a wire especially around a radially outer portion of the tooth 221b.

As described with reference to FIG. 7, in view of controllability of the electric motor 1, it is desirable that the number of magnetic poles and the number of teeth should be smaller. On the other hand, in view of winding of a wire, each of the number of magnetic poles and the number of teeth is preferably four. Even in the case where each of the number of magnetic poles and the number of teeth is four, as in the electric motor 1a according to the first comparative example, if the maximum angle θ3 is smaller than 90 degrees, winding of the wire is difficult.

Thus, in this embodiment, the electric motor 1 includes four magnetic poles and the four teeth 21b, and the angle θ1 [degree] satisfies 90 degrees ≤θ1<180 degrees. Accordingly, controllability of the electric motor 1 can be enhanced, and winding of the wire can be made easy, advantageously. Thus, the density of the stator coil can be enhanced.

In addition, in this embodiment, in the yoke 21a, the joint part 212 has a length from the tooth 21b outward in the radial direction. The back yoke 211 has a length from the joint part 212 inward in the radial direction. Accordingly, each of the split cores 20 can be formed such that the split end portion 23a is located outside the line L1 in the radial direction, and thus, winding of the wire can be made easy.

The position sensor 4 is fixed by the insulator 22 between each adjacent two of the teeth 21b. Accordingly, the size of the electric motor 1 can be reduced.

Figure 15:
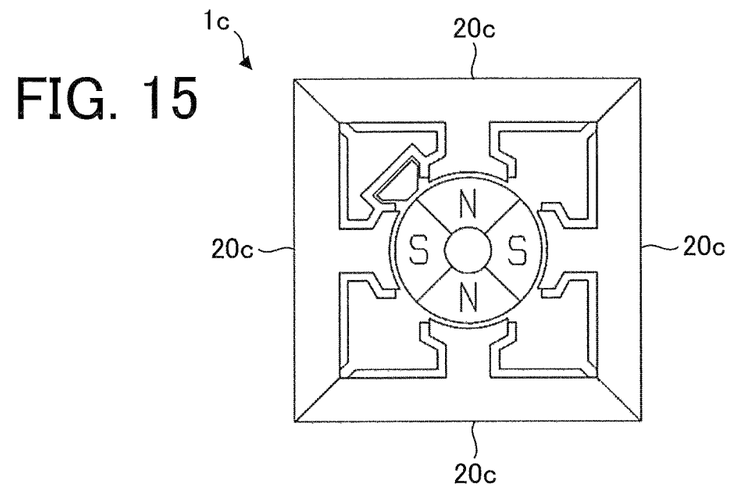
FIG. 15 is a plan view schematically illustrating a structure of an electric motor as a third comparative example.

FIG. 15 is a plan view schematically illustrating a structure of an electric motor 1c as a third comparative example.

Figure 16:
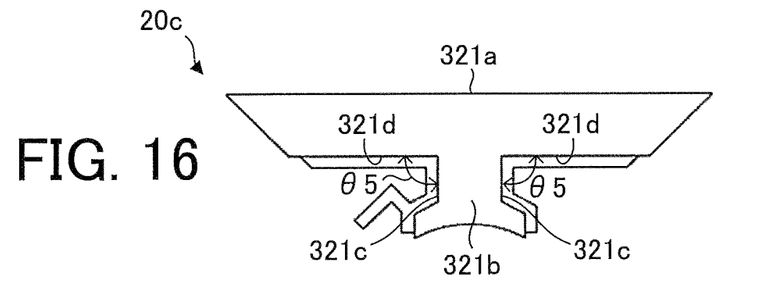
FIG. 16 is a plan view schematically illustrating a structure of a split core of the electric motor as the third comparative example.

FIG. 16 is a plan view schematically illustrating a structure of a split core 20c of the electric motor 1c as the third comparative example.

The electric motor 1c according to the third comparative example includes four magnetic poles and four teeth 321b, in a manner similar to the electric motor 1 according to this embodiment. The electric motor 1c includes four split cores 20c. In the electric motor 1c, a yoke 321a differs in structure from the yoke 21a of the electric motor 1 according to the embodiment. Specifically, the yoke 321a is formed straight. In the electric motor 1c, an angle θ5 formed by a side surface 321c of the tooth 321b and a side surface 321d of the yoke 321a on the inner side in the radial direction is 90 degrees. Thus, in a manner similar to the electric motor 1 according to this embodiment, controllability of the electric motor 1c can be enhanced, and winding of the wire can be made easy, advantageously.

Figure 17:
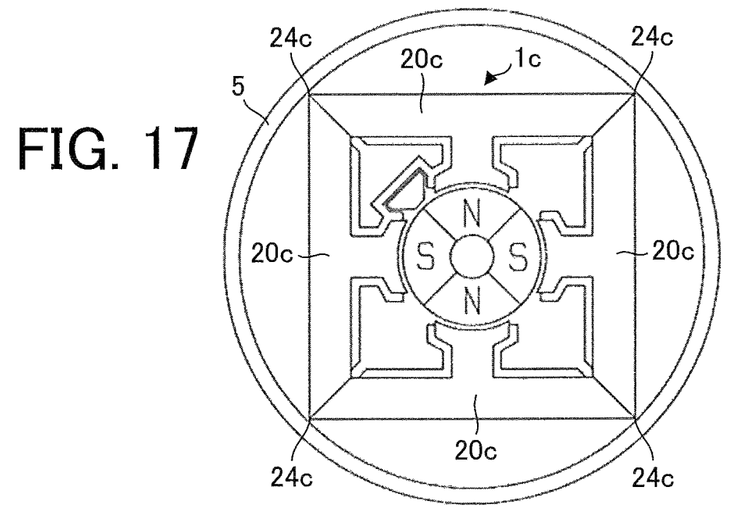
FIG. 17 is a plan view illustrating the electric motor according to the third comparative example disposed in a frame.

FIG. 17 is a plan view illustrating the electric motor 1c according to the third comparative example disposed in the frame 5.

Figure 18:
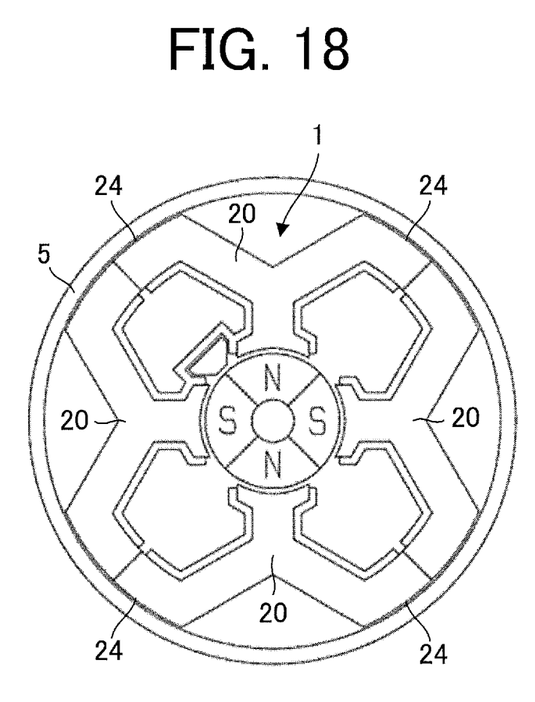
FIG. 18 is a plan view illustrating the electric motor according to the embodiment disposed in a frame.

FIG. 18 is a plan view illustrating the electric motor 1 according to the embodiment disposed in the frame 5.

The frame 5 is a cylindrical frame. As illustrated in FIG. 17, in the electric motor 1c, in the case where a contact portion 24c in contact with the inner peripheral surface of the frame 5 is in point contact with the frame 5, fixing of the stator 2c (four split cores 20c) is not stable in the frame 5, and the shape of the stator 2c is not easily maintained.

As illustrated in FIG. 18, in the electric motor 1 according to the embodiment, the contact portions in contact with the inner peripheral surface of the frame 5 are outer peripheral surfaces 24 of the yokes 21a (specifically, the back yokes 211) formed in the shape of a circular arc. Since the outer peripheral surfaces 24 have a shape of a circular arc, the outer peripheral surface 24 is in surface contact with the frame 5. Accordingly, fixing of the stator 2 is stabilized in the frame 5 and consequently the shape of the stator 2 can be easily maintained, advantageously.

Features of the embodiment and features of the comparative examples described above can be combined as appropriate.

What is claimed is:

1. An electric motor comprising:
   a stator; and
   a rotor disposed inside the stator, wherein
   the stator includes
      a tooth, and
      a yoke including a joint part having a length from the tooth outward in a radial direction of the stator and a back yoke having a length from the joint part inward in the radial direction, and
   an angle θ1 formed by a side surface of the tooth and a side surface of the yoke on an inner side in the radial direction of the stator satisfies 90 degrees ≤θ1<180 degrees.

2. The electric motor according to claim 1, wherein
   the stator includes a split face formed at an end portion in a circumferential direction of the stator, and
   an end portion of the split face on the inner side in the radial direction is located outside a boundary between the yoke and the tooth in the radial direction.

3. The electric motor according to claim 2, wherein the angle θ1 satisfies 90 degrees <θ1<180 degrees.

4. The electric motor according to claim 2, wherein an outer peripheral surface of the back yoke is formed in a shape of a circular arc.

5. The electric motor according to claim 2, further comprising a position sensor to detect a magnetic field from the rotor.

6. The electric motor according to claim 5, further comprising an insulator insulating the tooth, wherein
   the position sensor is fixed by the insulator beside the tooth in a circumferential direction.

7. The electric motor according to claim 2, wherein the electric motor is driven by a single-phase inverter.

8. The electric motor according to claim 2, wherein the electric motor is driven at 10000 rpm or more.

* * * * *